Aug. 7, 1951 — J. R. BAYSTON — 2,563,093
ICE MAKING MACHINE
Filed March 8, 1949 — 3 Sheets-Sheet 1

INVENTOR.
JOHN R. BAYSTON
BY
Lockwood, Goldsmith & Galt
ATTORNEYS.

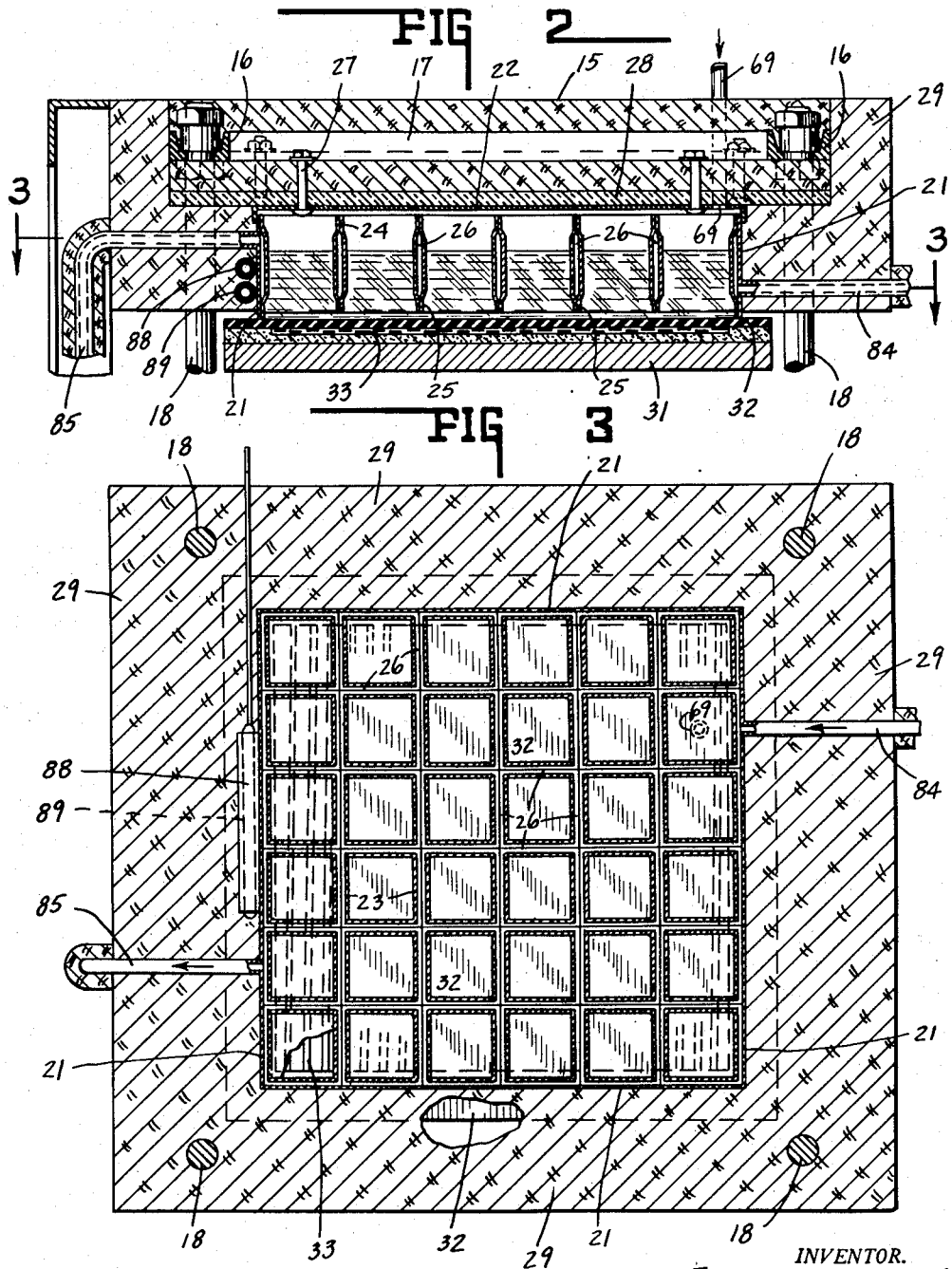

Aug. 7, 1951

J. R. BAYSTON 2,563,093

ICE MAKING MACHINE

Filed March 8, 1949

INVENTOR.
JOHN R. BAYSTON.
BY
Lockwood, Goldsmith & Galt
ATTORNEYS.

Patented Aug. 7, 1951

2,563,093

UNITED STATES PATENT OFFICE 2,563,093

ICE-MAKING MACHINE

John R. Bayston, Van Nuys, Calif., assignor, by mesne assignments, to Icecrafter Trust; John R. Bayston, Van Nuys, and Bernidine B. Oliver, North Hollywood, Calif., and Ward M. Vanderpool, Rockford, Ill., trustees Application March 8, 1949, Serial No. 80,265

10 Claims. (Cl. 62—2)

The present invention relates to a machine for manufacturing and delivering ice cubes automatically, and is particularly directed to the provision of a machine having its parts constructed and arranged to simultaneously freeze a number of individual ice cubes and automatically release the cubes from their freezing cells for discharge through a delivery chute, this application being a continuation in part of my copending but now abandoned application filed October 22, 1947, Serial No. 781,411, entitled Ice Making Machine.

One of the primary objects of the invention resides in the provision of such an ice making machine having a freezing unit including a multiplicity of individual freezing cells with each of the cells open at the bottom, together with a closure plate and gasket adapted to close and seal the bottom of the unit during the freezing operation, yet arranged to open when the freezing is complete, with means to automatically free the ice from the cells to permit the cubes to drop from the cells by gravity and slide down the opened closure plate into a delivery chute.

A still further object of the invention resides in the provision of an ice making machine having a multiplicity of freezing cells and a refrigerating system having a condenser circuit and an evaporator circuit, together with thermostatically actuated valves for alternately connecting the refrigerant chamber of the freezing cells into the condenser or evaporator circuits to cycle the machine through alternate freezing and thawing cycles.

A still further object of the invention resides in the provision of an ice making machine having an air tight sealed freezing unit together with means for introducing water and carbon dioxide gas or carbonated water into individual cells of the unit to provide gas charged ice cubes by freezing the individual cubes under high pressure and in the presence of carbon dioxide gas.

Another important object of the invention resides in the development of a novel method of manufacturing gas charged ice by continuously flowing a charging gas through the liquid during the freezing process; together with the provision of a machine for practicing the method.

A still further object of the invention resides in the provision of a machine of the general type indicated wherein the ice is frozen in relatively small individual cubes and the cubes are released from their freezing cells by the utilization of waste heat from the condenser circuit of the refrigerating system, so that a relatively large quantity of ice is automatically manufactured and delivered with respect to the power used.

Other objects will become apparent in connection with an examination of the embodiment of the machine illustrated in the attached drawings, in which:

Figure 2 is a detail sectional view taken substantially on the plane of the line 2—2 of Figure 1.

Figure 3 is a plan sectional view taken substantially on the plane of the line 3—3 of Figure 2.

Figure 1:
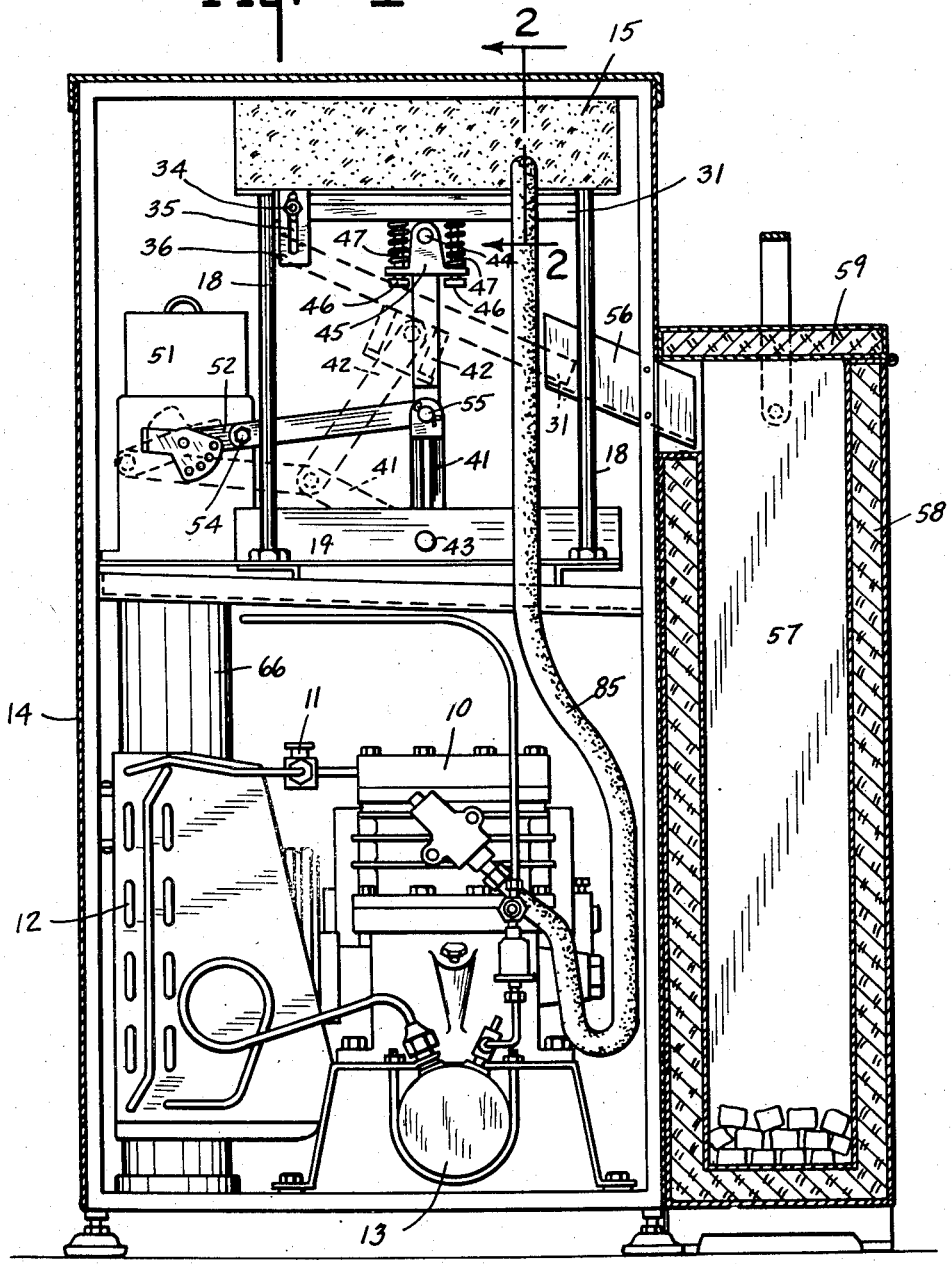
Figure 1 is a sectional view through an ice making machine as constructed in accordance with the teachings of this disclosure.
Figure 4:
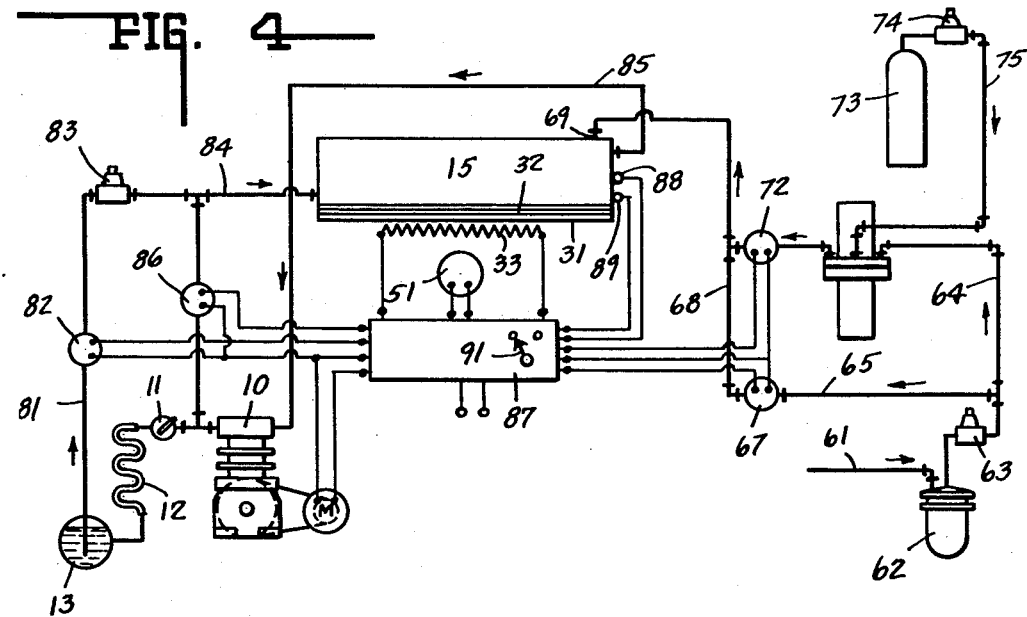
Figure 4 is a schematic diagram of the refrigerating system and the gas and water supply lines of the machine, together with the electrical control system therefor.

The refrigerating system of the present machine includes a somewhat conventional motor driven compressor 10, check valve 11 and condenser coil 12 arranged to compress a gaseous refrigerant and deliver it to the receiver 13. These devices may be of any conventional type, and are preferably housed in the lower portion of the machine cabinet 14. A freezing unit 15 is mounted in the upper section of the cabinet. The freezing unit 15 includes a frame constructed of transverse channels 16 and longitudinal channels 17 joined by a number of tie bolts 18 extending downwardly to lower frame members 19. The actual freezing unit consists of a square sheet metal box having vertical side walls 21 and a top 22. Said box is divided into a multiplicity of individual sections or cells by a number of generally square sleeves 23 grouped within the box with their upper edges joined at 24 and their lower edges united at 25 to provide narrow refrigerant chambers in the form of channels 26 between each pair of the sleeves. The sleeves thus act as individual freezing cells and the channels 26 pass around each cell to serve as refrigerant chambers, so that refrigerant passing through and evaporating in the said chambers will cool and freeze the liquid within the cells.

The sheet metal box of the freezing unit is supported thereon by machine screws 27. A fiber plate 28 is provided to give a firm support to the top 22 of the box, and an insulating layer 29 prevents undue waste of power. The bottom of the box is closed and sealed during the freezing cycle by a flat closure plate 31 having a resilient rubber gasket 32 across its upper surface. An electrical heating unit 33 is placed between the plate and the gasket in order to thaw the ice cubes frozen to the upper surface of the closure plate sufficiently to release the plate therefrom and permit easy removal of the cubes and prevent any possibility of accumulation of ice thereon. The plate 31 has a pair of studs 34 extending into vertical slots 35 in the stationary brackets 36 secured to the freezing unit frame, so that the entire plate may be raised and lowered in the slot and may be tilted to the position indicated in dotted lines in Figure 1.

The movement of the plate 31 is controlled by a pair of toggle links 41 and 42 extending between a lower pivot 43 on the frame members 19 and an upper pivot 44 on a bracket 45. The bracket 45 is in turn mounted on a pair of studs 46 and coiled compression springs 47 are slipped over the studs 46 so that when the links 41 and 42 are in vertical position (Figure 1) the bracket 45 will compress the springs 47 a slight amount and hold the plate 31 and its sealing gasket 32 in pressure engagement with the lower edges of the freezing unit box.

The functioning of the toggle joint 41—42 is controlled by a motor 51 having a crank 52 operating a link 53 extending from the crank pin 54 to the center pivot 55 of the toggle joint 41—42. Thus when the toggle joint 41—42 is in straight vertical position it will hold the closure plate 31 firmly but resiliently against the open bottom of the freezing unit box and the gasket 32 will maintain high pressure within the freezing unit and effectively prevent leakage of the water or charging gas, but when the freezing is complete the plate will be lowered free of the ice cubes formed in the cells of the freezing unit. Before opening the freezing unit and the cells therein, the surface of the gasket is warmed by the heating element 33 and hot refrigerant is passed through the refrigerant channels 26 of the freezing cells to thaw the surfaces of the individual ice cubes sufficiently so that they may fall out of the cells by gravity. The motor 51 then swings the crank pin 54 to the dotted line position shown in Figure 1, lowering the closure plate 31 into the inclined position illustrated, permitting the ice cubes to drop from the freezing unit and slide off of the closure plate to the delivery chute 56 and into the ice receiver 57. The receiver 57 is preferably provided with a hinged cover 59 and an insulating layer 58 in its walls to minimize melting of the ice.

The freezing unit is supplied with water from a water supply line 61 extending through a filter 62 and pressure regulating valve 63 to branch supply lines 64 and 65 leading to a carbonator 66 and a solenoid operated valve 67 respectively. When the valve 67 is open filtered water is supplied to the freezing cells through the line 68 leading to the inlet port 69 in the freezing chamber. The line 64 supplies water to the carbonator 66, from which it passes through the line 71 and solenoid valve 72 to the line 68 and thence to the freezing unit. A cylinder 73 of charging gas (such as carbon dioxide or oxygen) is connected through a reducing valve 74 and line 75 to the carbonator 66. Thus it will be apparent that if the valve 67 is opened, plain water will be supplied to the cells, but if the valve 72 is opened, carbonated or gas charged water is supplied through the same line.

The freezing unit is cooled by refrigerant from the liquid receiver 13, which passes through the line 81 and solenoid valve 82 to a conventional expansion valve 83, from which it flows through the inlet line 84 into the channels 26 between the freezing cells. The refrigerant evaporates in the channels 26, and the spent refrigerant passes out through the line 85 to the suction side of the compressor 10. Thus during the freezing cycle, the valve 82 is opened, and the path of the refrigerant is then from the compressor 10 through the check valve 11, condenser coil 12, receiver 13, line 81, valve 82, expansion valve 83, through the freezing unit, and back to the compressor. When the freezing cycle is complete, it is contemplated that hot refrigerant from the condenser circuit of the system may be used to free the ice cubes from the freezing cells with a minimum expenditure of power. To this end, the solenoid valve 82 is closed and the valve 83 opened between the compressor and the inlet line 84, so that hot refrigerant from the pressure side of the compressor and condenser coil passes through the valve 86 and directly to the refrigerant channels 26 of the freezing unit, from which it returns to the compressor through the line 85. This circulation of hot refrigerant through the channels will thaw the surfaces of the ice cubes sufficiently so that they will drop from the cells by gravity when the plate 31 is lowered. The cubes are also released from the plate 31 by the electrical heating unit 33 which may be energized prior to lowering.

The sequence of operations of the valves for the water supply and refrigerant and of the switches to energize the heating unit and motors are governed by a timing and cycling unit 87 actuated by the temperature responsive bulbs 88 and 89 on one of the side walls 21 of the freezing unit, so that the various instrumentalities operate in a predetermined sequence. For example, when plain ice is manufactured, the sequence of operation is as follows: the motor 51 is first energized to move the plate 31 upwardly and force the resilient gasket 32 against the side walls 21 of the freezing unit, closing and sealing it at the bottom. The solenoid valve 67 is then momentarily opened and water flows from the supply line 61 into the freezing unit until the pressure of the entrapped air in each cell equals the pressure of the incoming water, thereby regulating the water level in the cells. The water passes through the filter 62, pressure regulating valve 73, solenoid valve 67, and supply line 68 to the inlet port 69 of the freezing unit, where it distributes itself under the sleeves 23 of the freezing cells which are very slightly spaced from the plate 31. The valve 82 is opened, so that refrigerant from the liquid receiver 13 passes through the expansion valve 83 and the line 84 into the freezing unit. The refrigerant is vaporized in the channels 26, and the spent refrigerant returns through the line 85 to the compressor, and is again compressed and passed through the check valve 11 and condensing coils 12 to the receiver 13.

The evaporation of the refrigerant in the channels freezes the water within the cells, and when the freezing is complete the temperature responsive bulb 88 acts through a suitable control circuit diagrammatically indicated at 87 to energize the heating unit 33, close the solenoid valve 82, and open the solenoid valve 86. With the valve 82 closed, no refrigerant will be supplied to the channels 26 from the evaporator circuit of the refrigerating system, but hot refrigerant from the condensing circuit will be passed through the valve 86 and line 84 to flow into said channels to warm the cell walls and free the individual cubes of ice.

The circuit through the timing and cycling unit 87 also energizes the motor 51 to break the toggle joint 41—42, lower and move the plate 31 into the inclined position shown in Figure 1, so that the individual cubes of ice may drop from the cells and be discharged thereby into the receptacle 57 through the delivery chute 56. When the cubes are released the temperature of the bulb 89 rises, and the circuit to the unit 87 again energizes the motor 51 to move the plate 31 upwardly and close the freezing unit so that the entire cycle of operation will be repeated.

When carbonated ice, or ice charged with other gases is manufactured, the switch 91 is moved to its opposite position, changing the characteristics of the circuit through unit 87 so that the valve 72 will be opened instead of the valve 67. The rest of the sequence of operations is the same, but since the water supplied to the freezing unit is taken from the carbonator 66, charging gas from the cylinder 73 is passed into said unit so that the ice is frozen in the presence of gas under high pressure.

Figure 5:
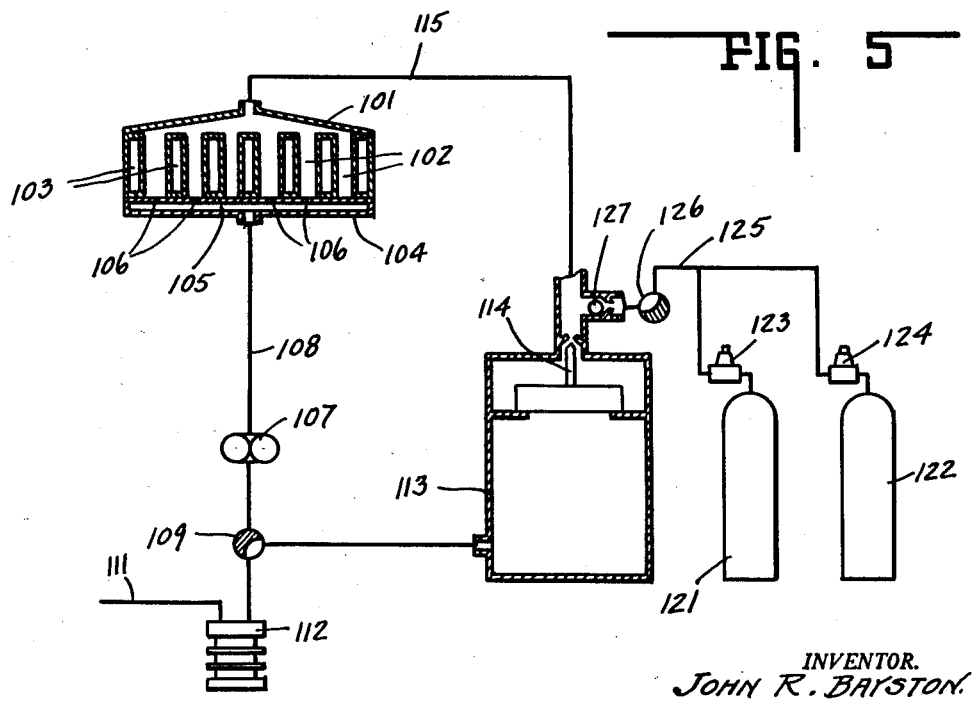
Figure 5 is a diagrammatic illustration of a modified form of the invention.

In the modified form of the invention illustrated in Figure 5 the freezing unit 101 includes a multiplicity of freezing cells 102 and refrigerant channels 103, but is provided with a closure plate 104 having an internal passage 105 and a multiplicity of inlet ports 106, with one of the ports located in each of the freezing cells. The passage 105 is connected with a pump 107 through a supply line 108 leading to the two-way valve 109. The valve 109, in starting position, receives water through the supply line 111 and filter 112 and passes it to the reservoir 113 until the rising level of the water lifts the float valve 114 and closes the line 115 to the top of the freezing unit. The valve 109 is then turned to its opposite position so that the pump 107 will move the water from the reservoir 113 to the freezing cells. The size of the reservoir is such that the quantity of liquid contained is the proper amount to be received in the freezing cells 102, but even after the reservoir is filled, operation of the pump 107 may be continued so that as the water in the cells is freezing, air is constantly injected into the bottom of each cell, where it will bubble upwardly through the water while freezing takes place. This results in clear, unclouded ice, and also permits the oxygen present in the air to be absorbed sufficiently to increase the palatability of the ice.

A pair of compressed gas cylinders 121 and 122 (which may contain carbon dioxide and oxygen, for exmaple) are connected through reducing valves 123 and 124 to a gas line 125 and shut-off valve 126 to a check valve 127 entering the line 115. To produce charged ice in this form of the invention, the valve 126 is opened and the valves 123 and 124 set to give the desired mixture of charging gases. The mixture passes through the check valve 127 into the line 115 and reservoir 113, so that the operation of the pump 107 recirculates the gas from the reservoir upwardly through the ports 106, through the water in the cells, and back to the reservoir. Since the plate 104 is firmly held against the freezing unit, the entire system is sealed and may operate under any desired pressure, with the result that any desired degree of carbonation of the ice may be obtained.

From the foregoing, it will be apparent that the teachings of this invention provide an ice making machine that is inherently simple in construction and operating principle, yet is capable of continuously producing large numbers of individual ice cubes suitable for beverage purposes, and is arranged so that the cubes automatically free themselves from the freezing cells and are discharged through a delivery chute into a convenient receptacle readily accessible for use.

It is to be noted that the design of the machine permits the production of a relatively large quantity of ice with minimum expenditure of power, since the individual freezing cells are very small and the path of heat transfer between even the center of any one of the individual cubes and the refrigerant channel is so short as to keep the thermal losses of the machine at a minimum. Moreover, the freezing unit is completely sealed during freezing, so that the device may be used to manufacture carbonated ice or ice charged with any other gases, and the recirculation of the charging gases through the water as it freezes aids in achieving a high degree of gas concentration in the ice. The invention thus marks a valuable forward step in the art, not only in the disclosure of the improved mechanical features of the machine, but also in the novel method of freezing ice while flowing air or gas continuously through the liquid until the freezing is complete.

It is recognized that other modifications of the invention may be employed without departing from the inventive concept, and it is accordingly pointed out that the scope of the inventive thought is not limited to the precise details of the structure shown, but extends to any variation thereof coming within the terms of the appended claims.

The invention claimed is:

1. In an automatic continuous ice cube making machine, the combination of a freezing unit comprising a plurality of cells normally open at the bottom, a closure plate for said unit movable to close and seal said unit free of and in spaced relation to the open bottoms of the individual cells during a freezing cycle, means for introducing into the open bottom of said cells a liquid to be frozen into ice cubes, means for refrigerating said unit to freeze the liquid therein, mechanism operable upon completion of the freezing cycle to effect the lowering of said closure plate, and a fitting interposed between said plate and unit operable to position said plate in substantially parallel spaced relation to said unit during its initial lowering movement for receiving ice cubes from said unit and permit tilting of said plate during continued lowering thereof to slidably discharge said cubes.

2. In an automatic continuous ice cube making machine, the combination of a freezing unit comprising a plurality of cells normally open at the bottom, a closure plate for said unit movable to close and seal said unit during a freezing cycle, means for introducing into said cells a liquid to be frozen into ice cubes, means for refrigerating said unit to freeze the liquid therein, and mechanism operable upon completion of the freezing cycle to effect the movement of said closure plate to a predetermined position below said unit substantially parallel therewith, and a hinge construction between one side of said plate and unit effective to cause said plate to tilt downwardly from said lowered position for receiving and discharging ice cubes therefrom.

3. In an automatic continuous ice cube making machine, the combination of a freezing unit comprising a plurality of cells normally open at the bottom, a closure plate for said unit movable to close and seal said unit during a freezing cycle, means for introducing into said cells a liquid to be frozen into ice cubes, means for refrigerating said unit to freeze the liquid therein, means for heating said plate to separate it from the liquid frozen over the surface thereof, mechanism operable to effect the lowering of said plate from said unit for opening it to permit ice cubes to drop by gravity therefrom, and a temperature control associated with said unit operative to initiate the heating of said plate and the operation of said mechanism upon completion of the freezing cycle.

4. In an automatic continuous ice cube making machine, the combination of a freezing unit comprising a plurality of cells normally open at the bottom, a closure plate for said unit movable to close and seal said unit during a freezing cycle, means for introducing into said cells a liquid to be frozen into ice cubes, means for refrigerating said unit to freeze the liquid therein, a heating element carried by said plate for defrosting the frozen liquid in said unit from the surface thereof, mechanism operable to effect the lowering of said closure plate a predetermined distance below said unit substantially parallel therewith, and temperature controlled means effective upon completion of the freezing cycle for rendering said heating element and mechanism operable.

5. In an automatic continuous ice cube making machine, the combination of a freezing unit comprising a plurality of cells normally open at the bottom, a closure plate for said unit movable to close and seal said unit during a freezing cycle, means for introducing into said cells a liquid to be frozen into ice cubes, means for refrigerating said unit to freeze the liquid therein, a heating element carried by said plate for defrosting the frozen liquid in said unit from the surface thereof, mechanism operable to effect the lowering of said closure plate a predetermined distance below said unit substantially parallel therewith, temperature controlled means effective upon completion of the freezing cycle for rendering said heating element and mechanism operable, and a hinge connection between one side of said plate and unit effective to cause said plate to tilt downwardly from its lowered position for receiving ice cubes from said unit and causing them to slide from said machine.

6. In an automatic continuous ice cube making machine, the combination of a freezing unit comprising a plurality of cells normally open at the bottom, a closure plate for said unit movable to close and seal said unit during a freezing cycle, means for introducing into said cells a liquid to be frozen into ice cubes, means for refrigerating said unit to freeze the liquid therein during a freezing cycle and warm said unit to partially thaw the frozen liquid therefrom upon completion of the freezing cycle, mechanism controlled by the temperature of said unit operable to effect the lowering of said closure plate, and a hinging bracket structure connecting said plate and unit to limit the lowering of said plate a predetermined distance below said unit and in substantially parallel relation thereto for permitting said cubes to drop thereon during the warming of said unit following said freezing cycle.

7. In an automatic continuous ice cube making machine, the combination of a freezing unit comprising a plurality of cells normally open at the bottom, a closure plate for said unit movable to close and seal said unit during a freezing cycle, means for introducing into said cells a liquid to be frozen into ice cubes, means for refrigerating said unit to freeze the liquid therein during a freezing cycle and warm said unit to partially thaw the frozen liquid therefrom upon completion of the freezing cycle, and mechanism controlled by a predetermined low temperature of said unit operable to effect the lowering of said closure plate therefrom upon completion of the freezing cycle to permit the ice cubes to drop by gravity from their respective cells and return said closure plate to close and seal said unit controlled by a predetermined high temperature thereof.

8. In an automatic continuous ice cube making machine, the combination of a freezing unit comprising a plurality of cells normally open at the bottom, a closure plate for said unit movable to close and seal said unit during a freezing cycle, means for introducing into said cells a liquid to be frozen into ice cubes, a refrigerant channel in said unit associated with said cells, means for alternately passing a refrigerant through said channel during the freezing cycle and passing a hot gas therethrough for warming said cells to free the ice cubes therein during a discharge cycle, a control unit responsive to the temperature of said freezing unit, and mechanism controlled by said control unit operable to effect the lowering of said closure plate from said freezing unit upon a predetermined low temperature thereof being reached and return said plate to closing and sealing engagement with said freezing unit upon a predetermined high temperature thereof being reached.

9. In an automatic continuous ice cube making machine, the combination of a freezing unit comprising a plurality of cells normally open at the bottom, a closure plate for said unit movable to close and seal said unit during a freezing cycle, means for introducing into said cells a liquid to be frozen into ice cubes, a refrigerant channel in said unit associated with said cells, means for alternately passing a refrigerant through said channel during the freezing cycle and passing a hot gas therethrough for warming said cells to free the ice cubes therein during a discharge cycle, and mechanism operable upon completion of the freezing cycle to effect the lowering of said closure plate a predetermined distance below said unit substantially parallel therewith and tilt it from its lowered position for receiving ice cubes dropped by gravity from their respective cells during said discharge cycle.

10. In an ice making machine, the combination of a freezing unit including a plurality of individual cube ice size cells open to the unit, each cell being defined by vertical walls, a refrigerant passage associated with each of said cells for directly refrigerating the surrounding wall surfaces thereof, a sealed closure for said unit extending over the top of said cells, a single shiftable closure member common to all of said cells for sealing the bottom of said unit when in closed position and permitting ice cubes to drop from said cells when in open position, and means for injecting charged liquid into said cells under pressure, said charged liquid remaining under pressure during a freezing cycle.

JOHN R. BAYSTON.

REFERENCES CITED

The following references are of record in the file of this patent:

UNITED STATES PATENTS

| Number | Name | Date |
|---|---|---|
| 1,327,414 | Willcox | Jan. 6, 1920 |
| 1,426,640 | Hill | Aug. 22, 1922 |
| 1,449,225 | Griesser | Mar. 20, 1923 |
| 1,757,033 | Wolcott | May 6, 1930 |
| 1,796,568 | Lee | Mar. 17, 1931 |
| 2,240,769 | Glazer | May 6, 1941 |
| 2,361,137 | Terry et al. | Oct. 24, 1944 |
| 2,435,285 | Lucia | Feb. 3, 1948 |